March 4, 1930.  J. R. WARREN  1,749,552
SPRING RETAINER
Filed May 10, 1928
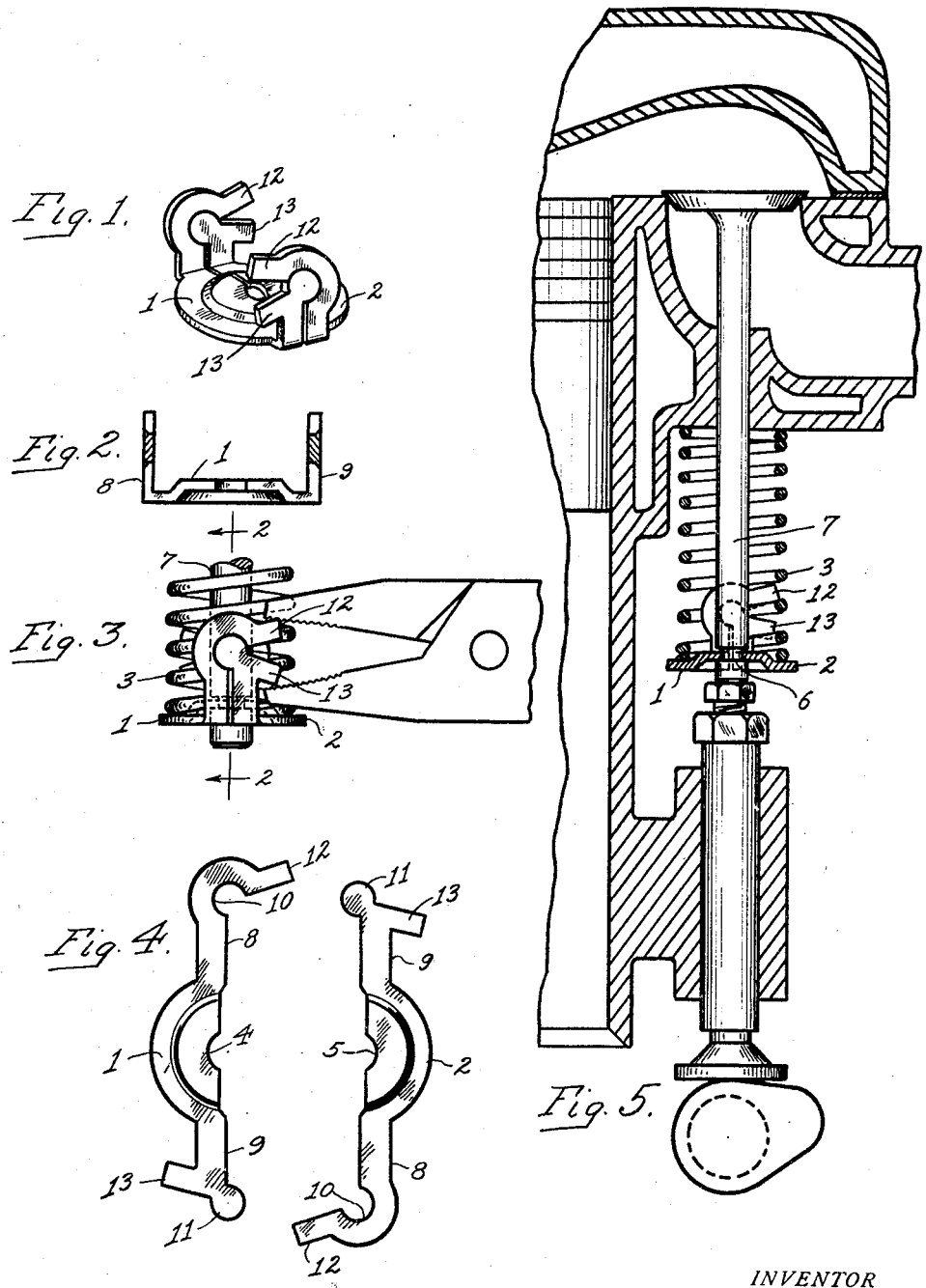
INVENTOR
John R. Warren.
BY Cyrus N. Rice,
ATTORNEY
Witness:

Patented Mar. 4, 1930

1,749,552

UNITED STATES PATENT OFFICE

JOHN R. WARREN, OF GRAND RAPIDS, MICHIGAN, ASSIGNOR OF ONE-HALF TO ALFRED BRECHTING, OF GRAND RAPIDS, MICHIGAN

SPRING RETAINER

Application filed May 10, 1928. Serial No. 276,559.

This invention relates to spring retainers particularly suited for valve stems.

The main objects of this invention are to provide an improved retainer for valve springs and the like which is automatically retained on the valve stem by the pressure of the spring; to provide a valve stem spring retainer which can be readily and quickly removed from engagement with the valve stem; to provide a device of this character which comprises only two parts hingedly connected together; and to provide a retainer which may be constructed by pivotally connecting two identical sheet metal stampings.

An illustrative embodiment of this invention is shown in the accompanying drawings, in which:—

Fig. 1 is a view in perspective of my improved spring retainer.

Fig. 2 is a sectional view of the retainer only taken on the line 2—2 of Fig. 3.

Fig. 3 is a fragmentary view in elevation of the retainer in position on a valve stem showing how the same may be disengaged from the stem by the use of a pair of pliers.

Fig. 4 is a plan view of two of the members in reversed position to each other showing how they may be interfitted to form the retainer.

Fig. 5 is a fragmentary view in vertical section of the improved retainer in position on the valve stem of an internal combustion motor.

Heretofore valve springs have been usually retained on their valve stems by employing a washer which cooperates with a yoke; a transverse pin carried in a slot through the end of the stem; a pair of half cones; or other such parts.

By reason of the fact that valve springs are usually located so as to be not readily accessible, it usually required more time to remove and replace the valve spring than it does to grind or reface the valves and valve seats. When the usual valve spring lifter is inserted under the spring and the spring raised to release the retainer, it was then necessary to reach in with the fingers or pliers and grasp and withdraw the yoke, pin or the like from under the washer. On account of the limited space and inconvenient location of the parts, the work has been both costly and patience trying.

With my present invention the retainer may be removed without the use of a valve spring lifter. All that is necessary is to reach in with a pair of pliers, pinch together a pair of quite accessible lugs, and the valve stem is automatically released from the retainer. In replacing the valves, the usual form of lifter is placed under the retainer and the spring compressed until the retainer is raised to the annular groove of the stem, at which time the retainer will automatically enter the groove and the action of the spring will keep the retainer locked to the stem.

In the construction shown in the drawings, the retainer comprises a pair of identical sheet metal stamping members having semicircular head portions 1 and 2 adapted to fit edge to edge in the same plane, to form an annular bearing surface for the valve spring 3.

The abutting edges of the members 1 and 2 are provided with notches 4 and 5 respectively which form a circular passage when the members are in abutting relationship so as to embrace and fit in the annular groove 6 of a valve stem 7.

The heads 1 and 2 are each provided with a pair of arms 8 and 9 at diametrically opposite sides thereof which are preferably formed integrally with the heads and then bent up perpendicularly to the plane of the heads. The arm 8 has an annular socket 10 adjacent the outer end thereof for cooperating with an annular trunnion 11 formed on the outer end of the arm 9 to form a hinged pivot joint.

By placing two of the members together in reversed position as shown in Fig. 4, the trunnion and socket of one member will fit into and embrace respectively the socket and trunnion of the other member. When the arms 8 and 9 are then bent up transversely to the plane of the bearing head, as shown most clearly in Fig. 1, the members are pivoted or hinged together at a point removed from the plane of the heads 1 and 2, so that when pivotally moved in one direction, the abutting heads 1 and 2 will be swung apart.

Means are provided for readily swinging the heads apart when in position on a valve stem, and comprise lugs 12 and 13 integrally formed on the outer ends of the arms 8 and 9. The lugs are disposed radially with respect to their respective hinge joints and are angularly spaced with respect to each other when the heads are in abutting relationship, as shown particularly in Figs. 1 and 3.

In the use of this spring retainer, the heads 1 and 2 are swung apart to allow the end of the valve stem 7 to pass therebetween and placed on the top end of the tappet, under the valve spring 3. A valve spring lifter of the usual forked construction is then placed under the retainer and the retainer raised against the action of the valve spring until the heads 1 and 2 register with the annular groove 6.

When this point has been reached, the valve spring, bearing against the outer edges of the heads 1 and 2, will snap the heads into the groove behind the annular shoulder of the valve stem formed by the groove. The bearing end of the valve spring being in a plane will hold the retainer locked on the valve stem by reason of the hinged connection being at a point removed from the plane of the head.

To disengage the retainer from the valve stem, the lugs 12 and 13 are pinched together by a pair of pliers as shown in Fig. 3, thereby swinging the heads 1 and 2 apart on their hinged connections, and withdrawing the heads from the annular groove 6 in the valve stem.

Although but one specific embodiment of this invention has been herein shown and described, it will be understood that numerous details of the construction shown may be altered or omitted without departing from the spirit of this invention as defined by the following claims:

I claim:

1. A device of the class described comprising a pair of members directly hinged together, each of said members having a bearing face and adapted to fit edge to edge and being in substantially the same plane, the adjacent edges of said members being notched in registry to form a passageway when said members are in abutting relationship, the point of hinged connection of said members being removed from the plane of said bearing faces so that said abutting edges will move relatively to each other when said members are swung on their hinged connections.

2. A device of the class described comprising a pair of members adapted to abut edge to edge and being in the same plane to form a bearing seat for a spring, the abutting edges of said members being notched in registry to provide a passageway, transversely extending arms on said members at diametrically opposite sides thereof, the adjacent arms of each member being directly hinged together at a point removed from the plane of said bearing seat, so that said abutting edges will move relatively to each other when said members are swung on their hinged connections.

3. A device of the class described comprising a pair of members directly hinged together, each of said members having a bearing face and adapted to fit edge to edge and being in substantially the same plane, the adjacent edges of said members being notched in registry to form a passageway when said members are in abutting relationship, the point of hinged connection of said members being removed perpendicularly from the plane of said bearing faces so that said abutting edges will move relatively to each other when said members are swung on their hinged connections.

4. A device of the class described comprising a pair of members adapted to abut edge to edge and being in the same plane, said abutting edges being notched in registry to form a passageway, and upstanding arms on each of said members adjacent said abutting edges, the upper ends of the arms of one member being directly hinged to the adjacent arms of the other member, so that said members swing apart when hingedly operated in one direction.

5. A device of the class described comprising a pair of members adapted to abut edge to edge and being in the same plane, said abutting edges being notched in registry to form a passageway, upstanding arms on each of said members adjacent said abutting edges, the upper ends of the arms of one member being hinged to the adjacent arms of the other member, so that said members swing apart when hingedly operated in one direction, and a lug on each of said arms radially disposed with respect to their respective hinged connections, said lugs being angularly spaced apart when said members are in abutting relation for the purpose set forth.

6. A device of the class described comprising a pair of members adapted to abut edge to edge in the same plane to form a bearing seat for a spring, the abutting edges of said members being notched in registry to provide a passageway, transversely extending arms on said members at diametrically opposite sides thereof, the adjacent arms of each member being hinged together at a point removed from the plane of said bearing seat, so that said abutting edges will move relatively to each other when said members are swung on their hinged connections, and radially disposed, angularly spaced lugs on said arms for the purpose set forth.

7. The combination of a valve stem having a shoulder adjacent the end thereof, a spring retainer comprising a pair of members adapted to embrace said stem and abut against said shoulder, means for hingedly connecting said members directly together so as to swing said members apart and disengage from said shoulder, and a spring bearing against said members to normally retain them in engagement with said shoulder.

8. The combination of a valve stem having a shoulder adjacent one end thereof, a spring retainer comprising a pair of members adapted to abut edge to edge and being in substantially the same plane, the abutting edges of said members being notched in registry to embrace said valve stem back of said shoulder, upstanding arms on each of said members adjacent said abutting edges, the adjacent arms of each member being directly pivoted to each other at a point removed perpendicularly from the plane of said members so that said members swing apart when pivotally moved in one direction, and a spring bearing against said members for normally holding them in abutting relationship to engage said shoulder.

9. The combination of a valve stem having a shoulder adjacent one end thereof, a spring retainer comprising a pair of members adapted to abut edge to edge in substantially the same plane, the abutting edges of said members being notched in registry to embrace said valve stem back of said shoulder, upstanding arms on each of said members adjacent said abutting edges, the adjacent arms of each member being pivoted to each other at a point removed perpendicularly from the plane of said members so that said members swing apart when pivotally moved in one direction, a spring bearing against said members for normally holding them in abutting relationship to engage said shoulder, and lugs on said arms extending radially from their respective pivotal connections and angularly spaced with respect to each other when said members are in abutting relationship.

10. A device of the class described comprising a pair of semicircular members adapted to abut edge to edge and being in the same plane to form an annular bearing seat for a spring, the abutting edges of said members being notched in registry to provide a passageway, transversely extending arms on said members at diametrically opposite sides thereof, the adjacent arms of each member being directly hinged together at a point removed from the plane of said bearing seat, so that said abutting edges will move relatively to each other when said members are swung on their hinged connections.

In testimony whereof I have hereunto set my hand at Grand Rapids, Michigan, this 5th day of May, 1928.

JOHN R. WARREN.